United States Patent [19]

Felix

[11] 4,237,534
[45] Dec. 2, 1980

[54] BUS ARBITER
[75] Inventor: Kenneth A. Felix, Crystal Lake, Ill.
[73] Assignee: Motorola, Inc., Schaumburg, Ill.
[21] Appl. No.: 960,321
[22] Filed: Nov. 13, 1978
[51] Int. Cl.³ .................... G06F 9/46; G06F 13/00
[52] U.S. Cl. .................................................. 364/200
[58] Field of Search ... 364/200 MS File, 900 MS File

[56] References Cited
U.S. PATENT DOCUMENTS

| | | | |
|---|---|---|---|
| 3,348,210 | 10/1967 | Ochsner | 364/200 |
| 3,665,487 | 5/1972 | Campbell et al. | |
| 3,693,161 | 9/1972 | Price et al. | |
| 3,728,693 | 4/1973 | Macker et al. | |
| 3,761,879 | 9/1973 | Brandsma et al. | |
| 3,787,818 | 1/1974 | Arnold et al. | |
| 3,810,114 | 5/1974 | Yamada et al. | |
| 3,886,524 | 5/1975 | Appelt | |
| 3,979,730 | 9/1976 | Bennett et al. | |
| 3,984,819 | 10/1976 | Anderson | |
| 4,016,546 | 4/1977 | Bennett et al. | |
| 4,017,841 | 4/1977 | Jensen | 364/200 |
| 4,030,079 | 6/1977 | Benett et al. | |
| 4,041,472 | 8/1977 | Shah et al. | 364/900 |
| 4,047,157 | 9/1977 | Jenkins | 364/900 |
| 4,096,571 | 6/1978 | Van der Mey | 364/200 |
| 4,096,572 | 6/1978 | Namimoto | 364/200 |
| 4,130,865 | 12/1978 | Heart et al. | 364/200 |

OTHER PUBLICATIONS

Signetics FPLS Application Note, May 16, 1978, "Single Chip Multiprocessor Arbiter".
K. Soe Hojberg, "One-Step Programmable Arbiter for Multi-Processors", Computer Design, Apr. 1978, pp. 154–158.
W. W. Plumber, "Asynchronous Arbiters", IEEE Transactions on Computers, Jan. 1972, pp. 37–42.
R. C. Pearce, J. A. Field, and W. D. Little, "Asynchronous Arbiter Module", IEEE Trans. On Computers, Sep. 1975, pp. 931–933.

*Primary Examiner*—Gareth D. Shaw
*Assistant Examiner*—E. Chan
*Attorney, Agent, or Firm*—James A. Scheer; James W. Gillman

[57] ABSTRACT

An improved multiprocessor bus arbiter which provides dynamically prioritized access for a plurality of processors to shared peripheral devices on a common bus through bus access switches. The arbiter includes logic circuitry to which incoming bus access request signals are coupled and a memory means which stores bus access status. The logic circuit determines bus access based on the input request signal and the stored information. The arbiter is adapted to provide a cycle shared mode of access or a lock out mode of access, as may be required.

5 Claims, 6 Drawing Figures

BUS ARBITER

TECHNICAL FIELD

This invention relates generally to digital processing systems and, more particularly, to a bus arbiter for arbitrating bus access in a system composed of a plurality of digital controllers and at least one common peripheral device on a common bus.

BACKGROUND OF THE INVENTION

To increase efficiency and flexibility of digital computers, computer systems have been developed using multi-processor configurations which can process a number of programs concurrently. Further increase in efficiency has been achieved by using direct access controllers to permit direct communication between peripheral devices. Many of the prior art systems are not fully modular and thus require substantial system redesign to upgrade a smaller system to a larger system. Due to lack of redundancy they will also suffer a complete system failure if any vital sector fails. Some modular systems have been developed which allow both flexibility of growth and redundancy. However, they require that each direct access controller or processor (hereinafter referred to generically as a controller) is capable of performing all operations so that if all but one controller fails, the system would remain functional. This technique requires bus switching to permit sharing of peripheral devices such as memory and external I/O. Such sharing of devices on a common bus, however, would mean that two or more controllers might attempt to simultaneously access the shared bus thereby requiring one or more controllers to wait. When this contention occurs an arbiter device must determine which controller shall be granted access to the shared bus and which shall be denied access. It is often desirable that this arbiter device not allow any controller to be permanently locked out of the bus and that it permit only one controller to access the bus at any one time. Thus a dynamically prioritized bus access arbiter is needed to rotate access among requesting controllers.

It is also desirable that the arbiter be capable of dual mode operation so that it can operate in both a cycle shared mode and a lock out mode. In the cycle shared mode which is desirable for access to a common memory bus, access is given for only one cycle at a time. Therefore, all controllers can access memory even if a failure in the system would cause a permanent request for memory from one controller. If the lock out mode is used, desirable for access to external peripheral devices such as printers, the arbiter will maintain uninterrupted access to a controller as long as the access request signal is maintained. This will result in a lock out of all other controllers, however a failure of one controller, resulting in a permanent request for access would permanently lock out all others. The elimination of the permanent lock out problem requires the addition of watchdog circuitry which monitors normal program flow and resets the system when a failure is detected.

Known arbiter devices are relatively complex often consisting of another processor. This complexity makes it difficult to use them in a distributed network. As an example, a distributed arbiter could be made up of one arbiter circuit used in the cycle shared mode to control access to the memory bus and another arbiter circuit operated in the lock out mode to control access to the I/O bus. Thus failure of the arbiter in one sector will not necessarily lead to a complete system failure. In addition, known arbiter circuits do not permit a cycle shared mode of operation.

SUMMARY OF THE INVENTION

It is the object of this invention, therefore, to provide an improved bus arbiter in simple and reliable form which can be easily expanded to accommodate any number of controllers, which can be applied in a distributed structure, and which permits use in both a cycle shared mode and a lock out mode.

The apparatus of the present invention includes a logic circuit with a plurality of inputs made up of bus access request inputs from a plurality of controllers, and feedback signal inputs. The logic circuit, in response to bus access request signals and feedback signals, generates the next bus access grant state. This output of the logic circuit is coupled to memory elements which store the results and generate an access grant signal on the selected output line. The outputs are connected to the respective bus access switches which are activated by the bus access grant signals, thus connecting the bus and the requesting controller which has been granted access.

DESCRIPTION OF THE DRAWINGS

FIG. 6 is a functional block diagram of the invention employing a Programmable Read Only Memory.

DETAILED DESCRIPTION OF THE PREFERRED EMBODIMENT

Figure 1:
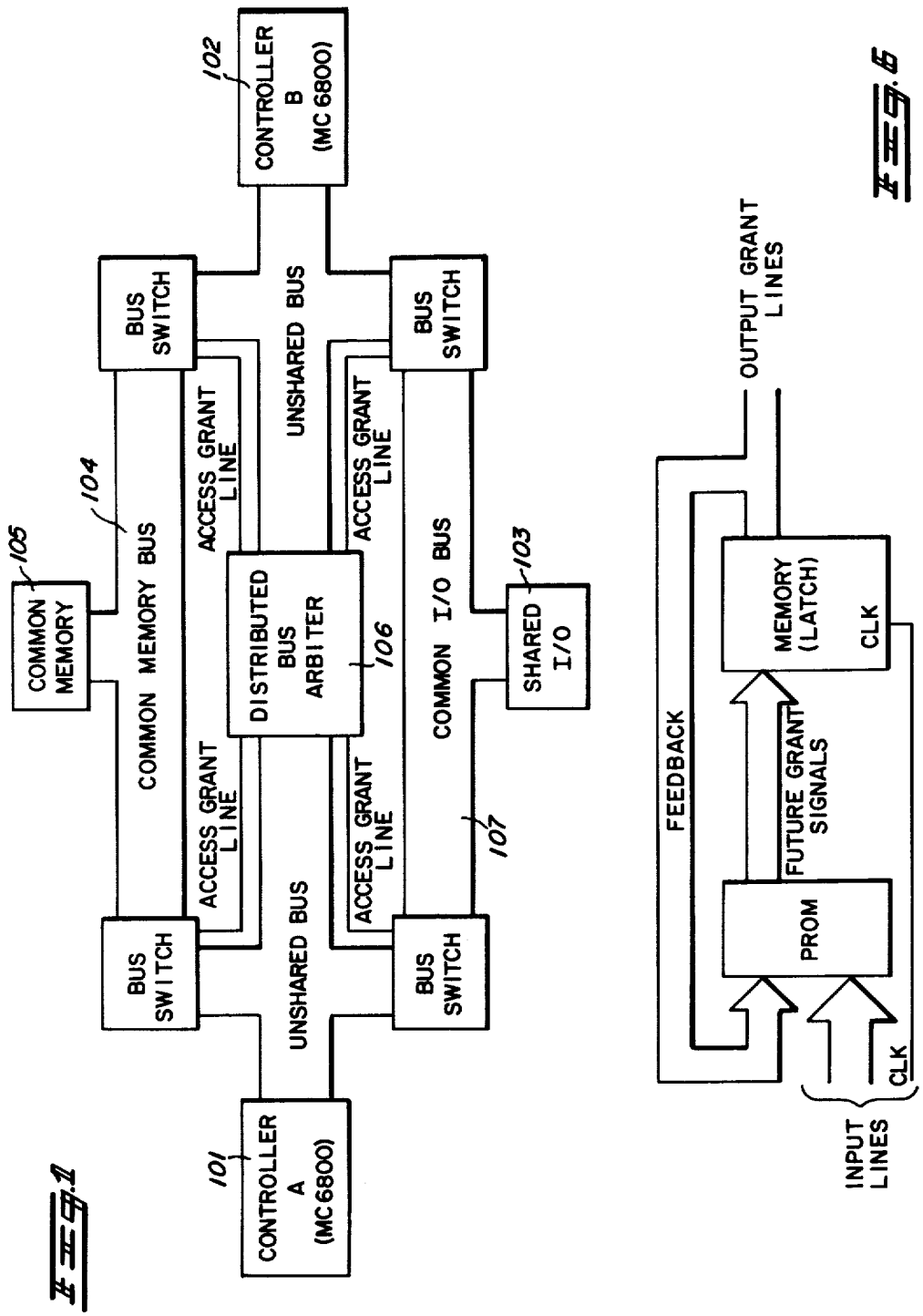
FIG. 1 is a functional block diagram of a two processor computer system which incorporates the present invention.

FIG. 1 is a block diagram of a basic multiprocessor system in which the invention can be applied. It is composed of two processors 101, 102, (such as well known Motorola MC6800 microprocessor), a common I/O bus 107 with one shared I/O port 103 and a common memory bus 104 to shared addressable memory 105. Any controlling devices capable of controlling transfer of data from one peripheral device to another (such as a direct access controller or a microprocessor) could employ such a common bus, shared device system using a bus arbiter. Throughout the specification and appended claims, the term "controller" is used to describe such a controlling device.

The distributed bus arbiter 106 is made up of two sections. One using the present invention in the cycle shared mode for control of access to the common memory bus 104, and the other section made up of the present invention in the lock out mode for control of access to the common I/O bus 107. Each tristate bus switch (such as a Motorola MC8T95 or a Motorola MC8T26) is controlled by a bus access grant line from the bus arbiter.

Figure 2:
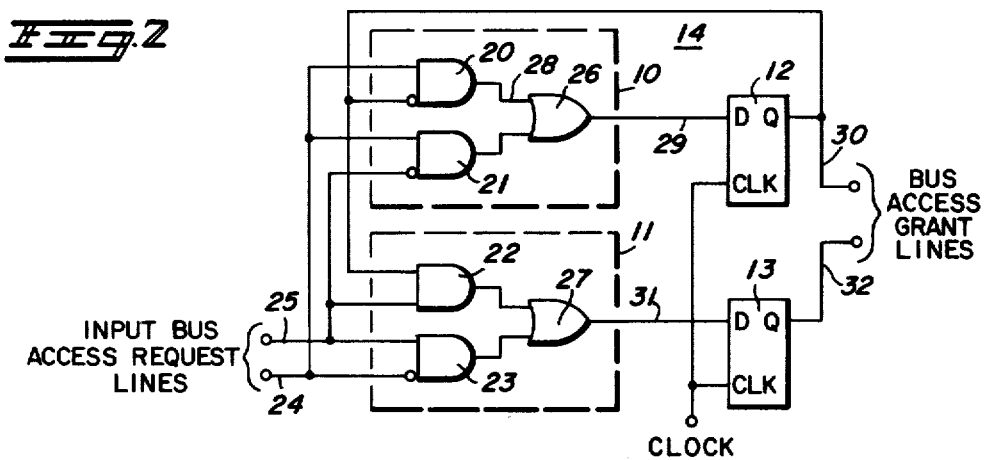
FIG. 2 is a detailed schematic diagram of a two input arbiter.
Figure 3:
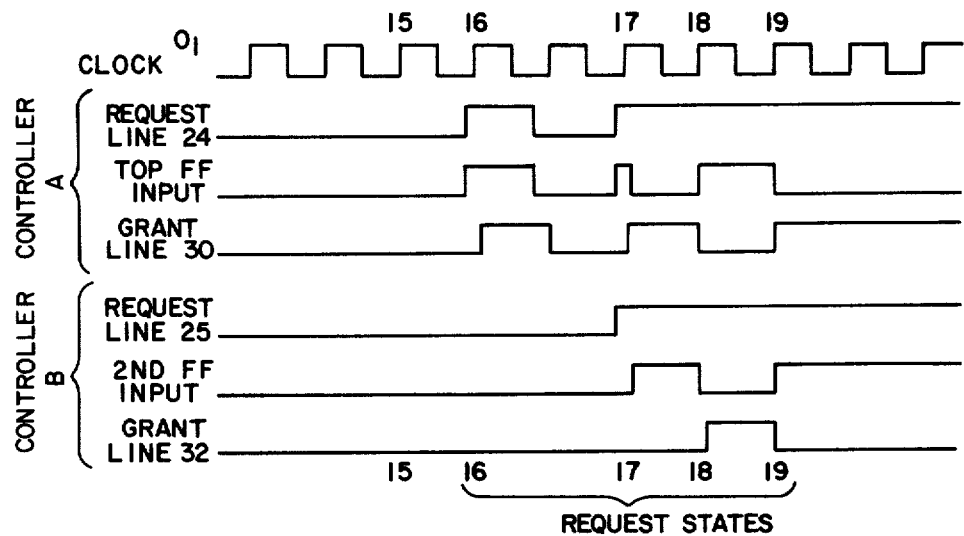
FIG. 3 is a timing diagram for the two input arbiter circuit.

FIG. 2 shows in schematic diagram for a two input arbiter including two AND/OR gate combinations, 10, 11 to supply the prioritizing scheme, and two clocked D flip-flops 12, 13 which act as memory for the arbiter. It is by the feedback line 14 to the AND/OR gates 10, 11 that the dynamic prioritizing scheme is formed. To illustrate detailed operation of the invention, there are five separate input conditions, noted on the timing diagram in FIG. 3, to be considered; an idle condition 15 with no controller requesting access to the bus, and four conditions 16, 17, 18 and 19, where controller A or B are given access to the bus. For the idle state 15 the output of flip-flop 12 is low before the clock pulse, and consequently, the feedback 14 from flip-flop 12 enables the AND gate 20 and disables the AND gate 22. Further, since no request is present (i.e. lines 24 and 25 are low) AND gate 21 and 23 are enabled. However, since the bus access request lines 24 and 25 are both low, the output of both OR gates 26 and 27 will be low and at the time of the clock pulse 15 both flip-flops 12 and 13 will stay low. This will result in lows on bus access grant lines 30 and 32 and thus the bus access switches to which they would be coupled will not be actived.

For the first request state 16, input 24 will be high, thus together with the low input from the feedback line 14 the AND gate 20 will output a high on line 28. This input to the OR gate 26 will result in a high output on line 29 to the flip-flop 12. This high on line 29 is the next or future bus access grant signal. Therefore, on the clock pulse 16, flip-flop 12 will change state resulting in a high on feedback line 14 and on the bus access grant line 30. This high on the output bus access grant line 30 is the present bus access grant signal which will activate its respective bus access switch. Before the feedback line 14 goes high, AND gate 22 will be disabled and AND gate 23 is disabled by the high on the input line 24. By the same reasoning as above, if input line 25 goes high instead of line 24, then the AND/OR combination 11 will be enabled and the AND/OR combination 12 will be disabled resulting in a high on line 31 and a high on output 32 after the clock pulse. It should be noted also, that the propagation delay through the AND/OR gate combinations 10, 11 will prevent any race condition from occurring.

If the circuit is returned to the idle condition and then both input request lines 24 and 25 go high simultaneously, then AND gate 20 will be enabled. The low on line 14 will produce a high on line 28 resulting in a high from OR gate 26 on line 29. Thus flip-flop 12 will go high on the clock pulse 17 putting a high on feedback line 14 and output bus access grant line 30. Simultaneously, AND gate 22 will have been disabled by the low on line 14 and AND gate 23 will have been disabled by the high on line 24, thus the high on input request line 25 will be blocked. However, after flip-flop 12 changes to a high state, line 14 will then disable AND gate 20 and enable AND gate 22. This will allow the high on request line 25 to propagate through to the OR gate 27 putting a high on line 31. Thus when the next clock pulse occurs at time 18 flip-flop 13 will go high resulting in a high on access grant output line 32. This high signal would then activate the bus access switch which would be coupled to line 32. After the second input request line 25 has been granted access the last possible condition occurs if both input request lines 24 and 25 remain high. Output of flip-flop 12 will be low because a low is applied on line 29 during the previously clock pulse 18 causing line 14 to be low, thus enabling AND gate 20. This will allow the high on input access request line 24 to propagate through to line 29 and will disable AND gate 22. Therefore, at the clock pulse 19 on a timing diagram, flip-flop 12 will go high resulting in a high on the bus access grant output line 30. At the same time, since AND gate 22 has been disabled, there will be a low on line 31 and flip-flop 13 will go low at the clock pulse 19 resulting a in low on bus access grant line 32.

Figure 4:
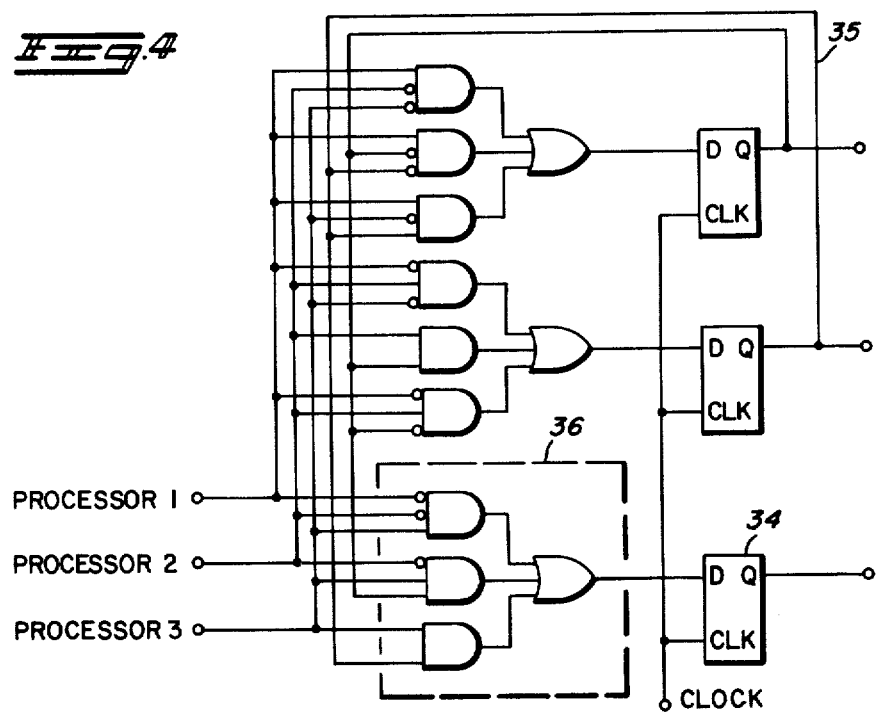
FIG. 4 is a detailed schematic diagram of a three input version of the invention.

It should be noted that this invention is not limited to a two input configuration but can be expanded for use with any number of controllers. FIG. 4 shows a schematic diagram of a three input arbiter and illustrates the simple expandability of the invention. Each added input line requires one additional flip-flop 34 and one additional feedback line 35 and one additional AND/OR combination 36. Also in the AND/OR stages, each AND gate and each OR gate requires not more than one additional input and one more AND gate is required in each AND/OR stage.

It is well known that there are numerous logic gate configurations which can accomplish the same function as an AND/OR combination. For example, a NAND/NOR combination could accomplish exactly the same function as the AND/OR combination 10 and 11 shown in FIG. 2. Also well known is the fact that the same logic functions can be accomplished by replacing gate combinations with a programmable read-only memory (PROM) as illustrated in FIG. 6. By having the gate inputs perform the function of addressing and then storing the necessary bit pattern in the PROM, the desired output to the flip-flops 12, 13 can be obtained. It should also be apparent that the flip-flops 12, 13 shown in FIG. 2 do not have to be only D flip-flops since many available memory elements could be adapted for the same function.

Figure 5:
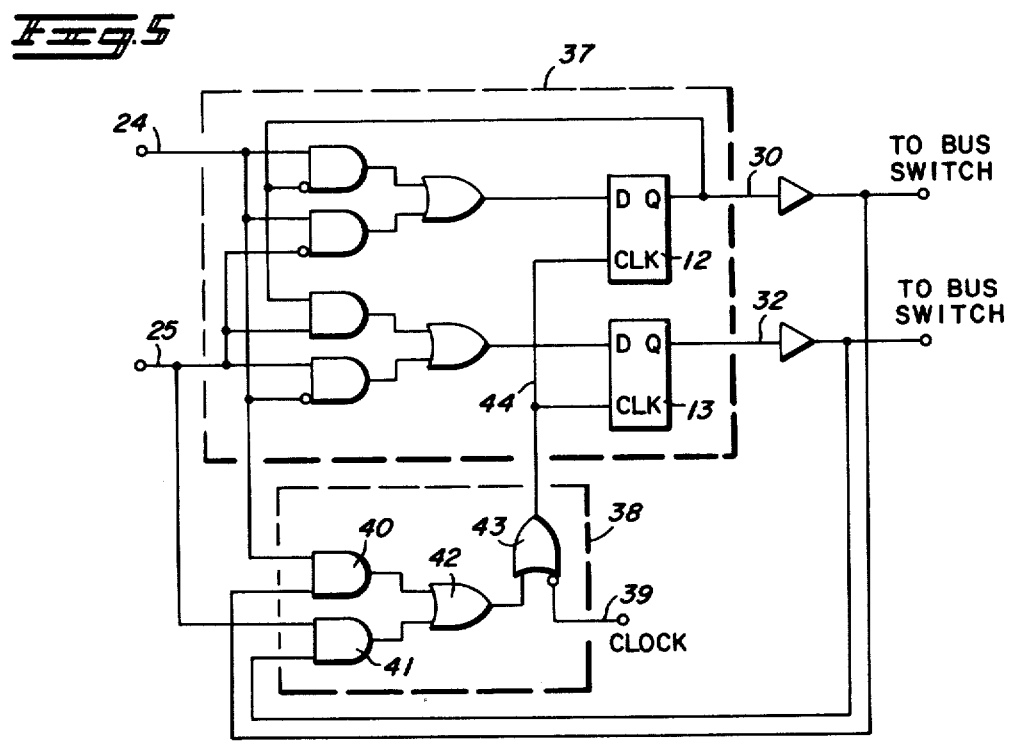
FIG. 5 is a detailed schematic diagram of a two input arbiter for use in a lock out mode.

As mentioned previously, this bus access arbiter has the flexibility to be useable in two modes, the lock out mode and the shared cycle mode. FIG. 5 shows the additional circuitry needed for the lock out mode which can be used for controlling access for peripheral I/O devices. Block 37 is the same as FIG. 2 and corresponding elements within are given the same numbers. The additional circuitry, block 38, disables the clock input 39 whenever an access grant signal exists at the same time the corresponding input access request line is high.

When bus access request input 24 is high and the corresponding bus access grant output 30 is high, AND gate 40 will cause OR gate 42 to put a high on the input OR gate 43 thus holding the clock line 44 high and consequently the flip-flops 12 and 13 will be latched, preventing the outputs 30 and 32 from changing. In like manner, the outputs 30 and 32 will be latched if bus access request line 25 and bus access grant line 32 are simultaneously high.

The second mode of operation possible is the shared cycle mode used for accessing a common memory bus. In this mode, access is given to each requesting controller on a rotating cycle by cycle basis. This prevents any one controller from being locked out of the memory bus by another controller or controllers which are permanently requesting bus access. This is the mode of operation for the circuit in FIG. 2 as previously described.

In summary then, an improved bus arbiter capable of operating in either a cycle shared mode or a lock out mode has been described. The arbiter is simple in form and thus may easily be used in a distributed structure so as to permit the implementation of a more reliable multi-controller system.

While a preferred embodiment of the invention has been described and shown, it should be understood that other variations and modifications may be implemented. It is therefore contemplated to cover by the present application any and all embodiments and variations that fall within the true spirit and scope of the basic underlying principles disclosed and claimed herein.

What is claimed is:

1. A bus arbiter for providing, in response to bus access request signals from two or more controllers, dynamically prioritized access to a common bus of a digital system have at least one peripheral device coupled to the common bus, and said two or more controllers coupled to the common bus through respective bus access switching means, said switching means activated by applied present bus access grant signals, the arbiter comprising:
   (a) a plurality of logic circuits each having input means coupled to a plurality of decoding AND gates inputs and the outputs of the AND gates are coupled to an OR gate, for generating at the output of the OR gate a future bus access grant signal based on the bus access request signals and one or more present bus access grant signals applied to said input means;
   (b) a plurality of memory devices for storing the present bus access grant signal, each of said memory devices coupled to the output of each said OR gate for updating the present bus access grant signal of the memory devices in response to the future bus access grant signal, and each memory device having an output terminal for applying the present bus access grant signal to the bus access switching means; and
   (c) direct feedback means for coupling the output terminal of at least one of the memory means to the input memory devices of each logic circuit supply the present bus access grant signal information thereto .

2. The bus arbiter of claim 1, including a control logic circuit, coupled to the memory devices and having input means for input of the present bus access grant signal and bus access request signals, for maintaining a present access grant signal to a particular access switch and to lock out access grant signals to other switches whereby access to the common bus is maintained until the access request signal from the currently accessing controller is removed.

3. The bus arbiter of claims 1 or 2 or 5 wherein each said AND gate is replaced by a NAND gate and each said OR gate is replaced by a NOR gate.

4. The bus arbiter of claims 1 or 2 wherein each memory device comprises a latch.

5. The bus arbiter of claim 1 wherein said arbiter is adapted to operate in a cyclic mode in response to bus access request signals for providing access to the common bus in successive cycles.

* * * * *